E. C. CLARK.
STONE PICKER.
APPLICATION FILED OCT. 4, 1921.

1,425,078.

Patented Aug. 8, 1922.
3 SHEETS—SHEET 1.

Inventor
E. C. Clark
By Howard P. Denison
Attorney.

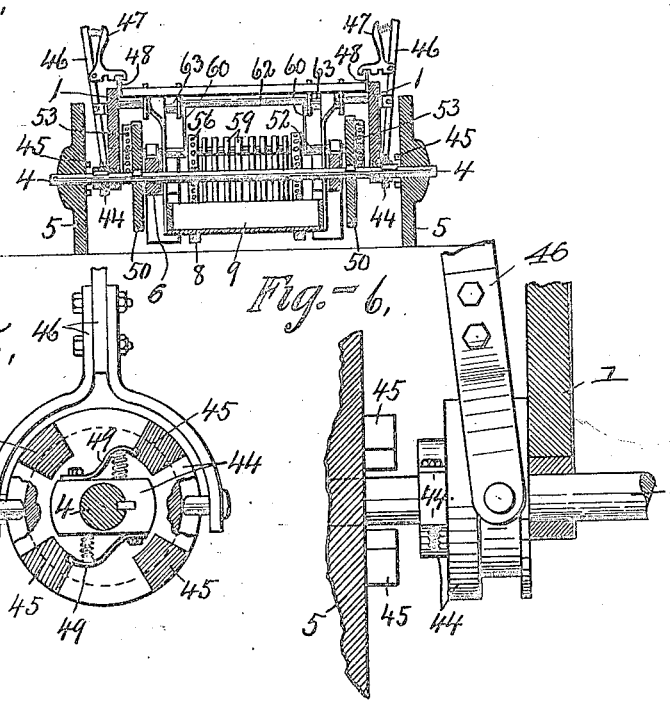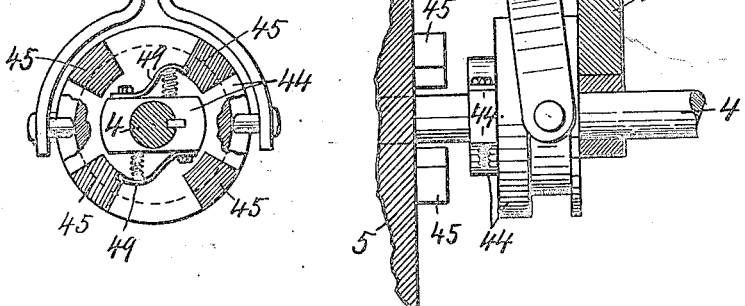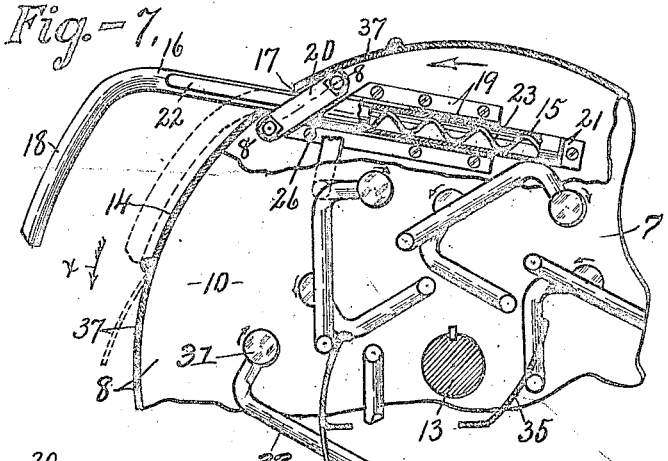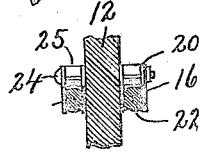

E. C. CLARK.
STONE PICKER.
APPLICATION FILED OCT. 4, 1921.

1,425,078.

Patented Aug. 8, 1922.
3 SHEETS—SHEET 3.

UNITED STATES PATENT OFFICE.

EUGENE C. CLARK, OF OSWEGO, NEW YORK.

STONE PICKER.

1,425,078.      Specification of Letters Patent.     Patented Aug. 8, 1922.

Application filed October 4, 1921. Serial No. 505,329.

*To all whom it may concern:*

Be it known that I, EUGENE C. CLARK, of Oswego, in the county of Oswego, in the State of New York, have invented new and useful Improvements in Stone Pickers, of which the following, taken in connection with the accompanying drawings, is a full, clear, and exact description.

This invention relates to a stone-picker adapted to be propelled by animal or other motive power and involves the use of a main supporting frame mounted upon suitable front and rear wheels in combination with a rotary pick-up drum and an endless conveyer, both mounted upon a supplemental vertical movable frame and adapted to be driven from the rear wheels as the machine is moved along the surface of the ground.

The main object is to provide simple and efficient means for automatically picking up stones from the surface of the fields and conveying them to a suitable receptacle on the machine as the latter is propelled forwardly.

Another object is to enable the pick-up drum to be raised and lowered at will to vary the depth of penetration of the pick-up fingers into the ground when the drum is adjusted for use and also to permit said drum to be elevated above the surface of the ground when the machine is in transit from one place to another, as for example, to the place of discharge of the load and return therefrom.

A further object is to provide means whereby the pick-up fingers may yield when contacting with objects which might tend to overstrain or break the fingers or other parts of the machine.

A still further object is to provide means for oscillating alternate circumferential rows of fingers as they are successively presented to their discharge positions to free the stones therefrom.

A further object is to provide the drum with oscillating fenders and means for operating the same for the purpose of deflecting the pick-up stones from the fingers at the point of discharge therefrom.

Other objects and uses relating to specific parts of the machine will be brought out in the following description:

In the drawings:

Fig. 4 is a transverse vertical sectional view taken on line 4—4, Fig. 1.

Fig. 5 is an enlarged inner end face view of one of the clutch connections between one of the wheels and the rear axle.

Fig. 6 is a rear elevation of the clutch shown in Fig. 5 together with a portion of the adjacent wheel and a portion of the main frame.

Fig. 7 is an end view, partly in section and partly broken away, of a portion of the pick-up drum showing one of the pick-up fingers, several of the operating levers for the swinging fenders or gates and the stationary cams at one end for operating said levers, said cams being shown in section.

Fig. 8 is a detail sectional view taken on line 8—8, Fig. 7.

Figure 1:
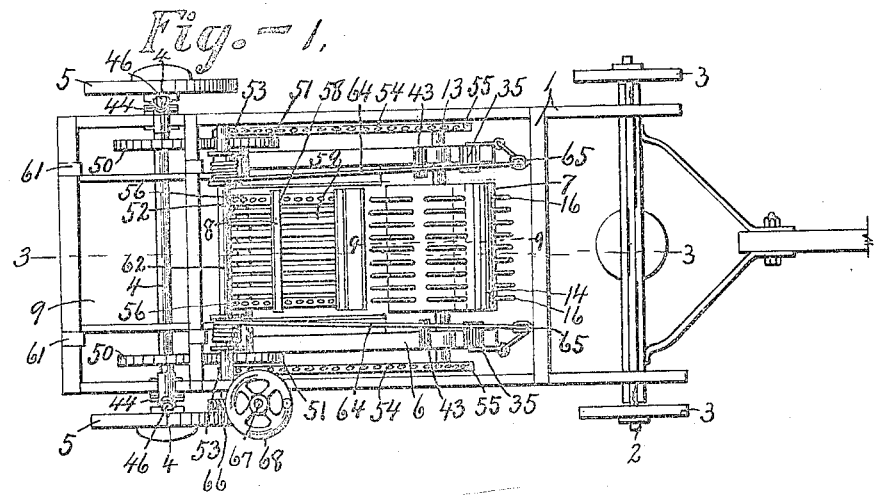
Figs. 1 and 2 are, respectively, a top plan and a side elevation of a stone-picker embodying the various features of my invention.

This machine comprises a main supporting frame —1— having a front steering axle —2— provided with supporting wheels —3—, a rear axle —4— provided with supporting wheels —5— and a supplemental frame —6— extending lengthwise of and between the side bars of the main frame —1— and having its rear end pivotally mounted upon the rear axle —4— and its front end provided with suitable bearings for receiving and supporting a rotary pick-up drum —7—, said supplemental frame serving also to receive and support an endless conveyer —8— for receiving the stones from the pick-up drum —7— and delivering them into a suitable receptacle —9— on the rear end of the machine.

The drum —7— comprises opposite end heads —10— and —11— and a series of intermediate disks or partitions —12—, all of substantially the same diameter and mounted in axially spaced relation upon a central supporting shaft —13—, which in turn is journaled upon the front end of the supplemental frame —6— for rotating the drum in a manner presently described, the peripheries of said end heads and disks being covered by a cylindrical band or housing —14— rigidly secured thereto in any well known manner not necessary to herein illustrate or describe to form a unitary part of the drum.

One of the end heads as —11— and each of the partitions —12— is provided with a series of, in this instance, six protruding tubular guides —15— arranged circumferentially around the axis of the drum in uniformly spaced relation for receiving the shanks of a corresponding number of pick-up fingers —16— which are slidable endwise in their respective guides through openings —17— in the peripheral band —14— and have their outer ends provided with hook-shaped extremities —18— projecting forwardly from the shanks in the direction of rotation for picking up stones from the ground as the drum is rotated.

The tubular guides —15— are secured to corresponding faces of their respective supporting members —11— and —12— by means of clamping plates —19— and are additionally held against endwise movement by clamping plates —20— and brackets —21—, which are also secured to the same end faces of said supports.

That is, the brackets —21— form abutments for the inner ends of the tubular guides —15— while the clamping plates —20— not only form abutments for the outer ends of the tubular guides but also serve to hold the pick-up fingers —16— against turning movement by engaging flattened portions —22— thereof but with sufficient clearance to allow the pick-up fingers to move endwise in the tubular guides —15— against the action of compression springs —23—, the latter being arranged within the tubes between the inner end walls thereof and the inner end faces of the shanks of the pick-up fingers —16— as shown in Fig. 7.

If desired, the clamping bolts as —24— by which the plates —20— are secured to the members —11— and —12— may be provided with rollers —25— for engaging opposite faces of the shanks of the pick-up fingers —16— and thereby permitting greater freedom of endwise movement without excessive friction.

Each pick-up finger —16— is, therefore, yieldingly held in its extreme outermost position by its compression spring —23— to enable it to yield inwardly in case it comes in contact with any obstruction not capable of being picked up thereby, the outward endwise displacement of said pick-up fingers being limited by stops as —26— at the inner ends of the flattened portions —22— adapted to engage the inner end of the corresponding clamping plates —20—.

These pick-up fingers —16— are arranged in lengthwise rows parallel with the axis of the drum and, therefore, parallel with each other so that those of each row may act in unison along the same line on the ground in facilitating the picking up of the loose stones, which may be encountered thereby during the rotation of the drum.

Each of the partitions or disks —12— is also provided with an additional series of, in this instance, six protruding tubular guides —27— arranged circumferentially about the axis of the drum in uniformly spaced relation and preferably on the end faces of said disks opposite that to which the protruding guides —15— are secured and directly opposite the first named guides so as to lie in the same lengthwise planes or rows for receiving the shanks of a corresponding number of pick-up fingers —28— similar to the fingers —16— in that they extend through openings —17— in the peripheral band —14— and terminate at their outer ends in hook-shaped extremities —29— projecting forwardly in the direction of rotation of the drum, said fingers —28— being arranged in lengthwise rows corresponding to those in which the fingers —16— are located so as to act simultaneously therewith in picking up loose stones from the ground along the same line.

These tubular guides —27— are held in place upon the disks or partitions —12— by clamping plates —30— and brackets —31—, the openings in the plates —30— for receiving the tubular guides —27—, being elongated transversely to permit lateral rocking movement of the tubular guides and fingers —28— carried thereby, the object of said lateral movement being to permit the pick-up fingers —28— to free the stones therefrom by lateral rocking agitation of the fingers.

The shanks of the fingers —28— are additionally held in place by clamping plates —20'— similar to the plates —20— in that they engage flattened portions —22'— on the shanks of said fingers to hold the latter against turning movement and also serve as abutments for the outer ends of the tubular guides —27— to prevent outward displacement of said tubes while the brackets —31— form abutments for the inner end of the tubular guides to prevent inward displacement thereof.

This lateral rocking movement of the guide tubes —27— and their corresponding fingers —28— is produced by rock-shafts —31—, one for each lengthwise row of fingers extending lengthwise through and journaled in the end walls of the drum, and provided with radial arms —32—, one for each tubular guide of the corresponding row, each arm —32— being operatively connected to the inner end of the tubular guide by means of a link —33— so that as each shaft is rocked about its axis against the action of their retracting spring —34—, it will cause a similar rocking movement of the tubular guide —27— and its pick-up fingers —28—.

Each rock-shaft —31— is caused to be operated during the downward movement of the corresponding pick-up fingers —28— or when the latter are in a position to discharge any stones which may have been picked up thereby and for this purpose, the outer end of each rock-shaft —31— is extended beyond the opposite end heads —10— and —11— of the drum and provided with crank arms —34'— movable into engagement with cams —35— on the adjacent sides of the frame —6— when the pick-up fingers with the stones carried thereby assume their position of discharge, thereby causing the fingers to free themselves from the stones by agitation thereof and allowing the freed stones to drop on to the conveyer —8—.

A deflecting plate —36— is fastened to the supplemental frame —6— to deflect the stones discharged by the drum on to the conveyer.

The peripheral band —14— is provided with a series of, in this instance, six movable sections —37—, one for each row of pick-up fingers and each extending the entire length of the drum and adapted to swing outwardly from a concentric position directly under the discharge fingers to form deflecting plates to protect the underlying portions of the fingers against injury by the fallen stones from the discharging fingers and it, therefore, becomes necessary to open these gates or deflecting plates immediately preceding or about the time of the discharge of the stones from the fingers onto the conveyer.

For this purpose, I have provided a series of, in this instance, six rock-shafts —38—, one for each row of pick-up fingers, each of said rock-shafts being provided with a radially projecting crank-arm —39— connected by a link —40— to the corresponding gate —37—, whereby when the rock-shaft —38— is rocked in one direction against the action of retracting springs —41—, it will open the corresponding gate, the springs —41— serving to yieldingly hold the gates in their closed positions.

Each rock-shaft —38— is extended entirely through the drum and beyond the end walls thereof and has its outer ends provided with crank-arms —42— adapted to engage cams —43— on the adjacent portions of the frame —6— to rock said shafts and thereby open the gates —37— as the several rows of pick-up fingers are brought to their discharge positions by the rotation of the drum, it being understood that the cams —35— and —43— are constructed and positioned so as to release the parts operated thereby immediately preceding the discharge of the stones from the several rows of pick-up fingers on to the conveyer.

The rear axle —4— is journaled in suitable bearings on the frame —1— and is provided with clutch members —44— splined thereon for axial movement into and out of engagement with clutch members —45— on the wheels —5—, which are loose on the shaft to permit the machine to be drawn forwardly or rearwardly without transmitting motion to the shaft —4— when the clutches —44— are disengaged from said wheels, while on the other hand, when the clutches are engaged with the wheels, rotary motion will be transmitted to the shaft, the clutches being controlled by separate levers —46— and held in different positions of adjustment by catch levers —47— engaging suitable keepers —48— on the frame of the machine as shown in Fig. 4.

Figure 3:
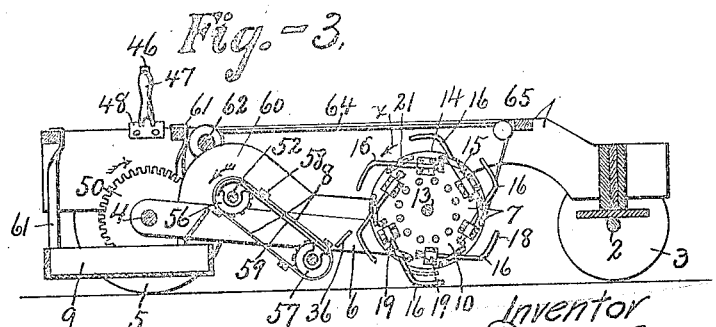
Fig. 3 is a longitudinal vertical sectional view of the same machine taken on line 3—3, Fig. 1.
Figure 9:
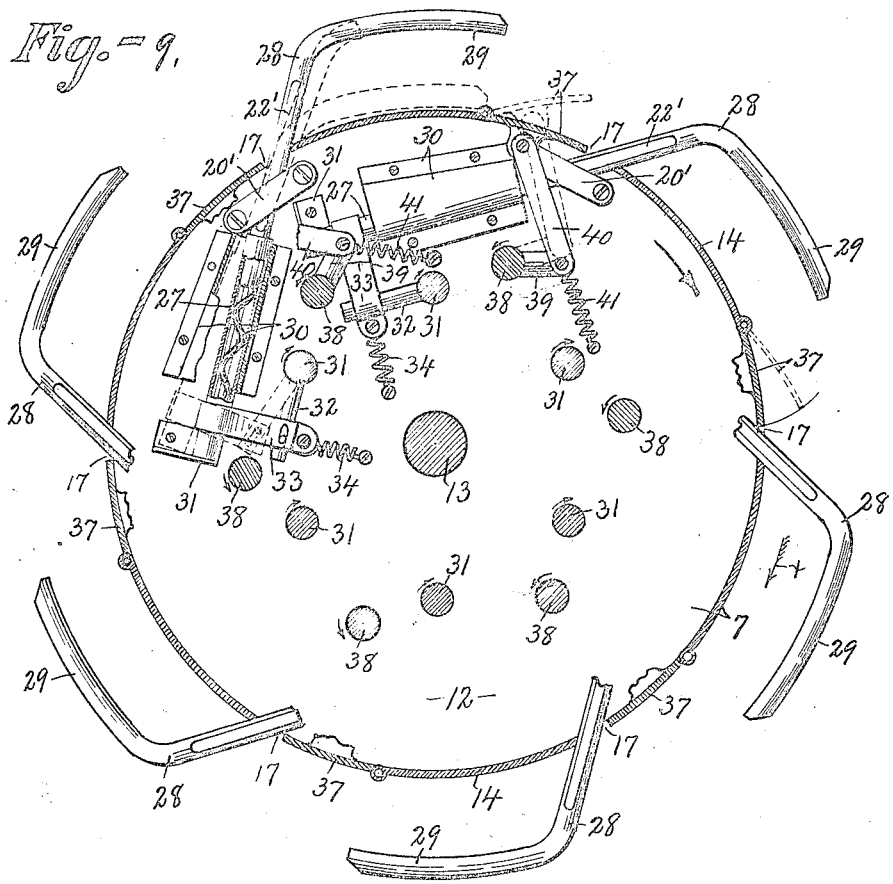
Fig. 9 is an enlarged transverse sectional view through the drum taken on line 9—9, Fig. 1, except that portions of the pick-up fingers and their respective supporting guides and supports are broken away.
Figure 10:
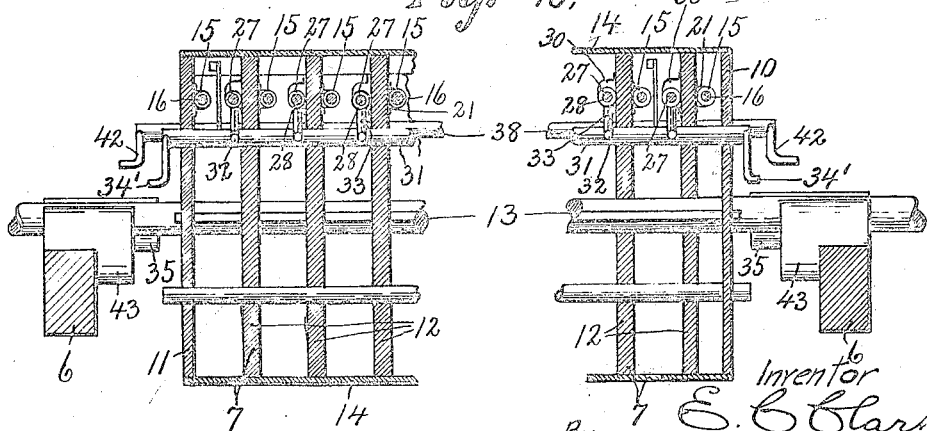
Fig. 10 is an enlarged longitudinal sectional view, partly broken away, of the pick-up drum showing the stationary cams at the ends thereof for operating the several rock-shafts for the swinging fenders and oscillating pick-up fingers.

Each clutch member —44— is provided with spring teeth —49— adapted to engage the clutch members —45— on the adjacent wheel and to permit the wheels to be rotated backward without disengaging the clutch therefrom. The means for transmitting motion from the shaft —4— to the drum —7— consists of gears —50— tight on the shaft —4— and meshing with companion gears —51— on a counter-shaft —52— which is journaled on the frame —1— and is provided with sprocket wheels —53— connected by side chains —54— to additional sprocket wheels —55— on the outer ends of the drum shaft —13—, thereby rotating the drum backward or in the direction indicated by arrow —X—, Figures 3, 7 and 9.

The counter-shaft —52— is provided intermediate its ends with sprocket wheels —56— in axially spaced relation and connected by the conveyer belt —8— to additional sprocket wheels —57— which are journaled on the supplemental frame —6— in a horizontal plane below and in a vertical plane in front of the sprocket wheels —52— so that the upper side of the belt may travel upwardly and rearwardly in an inclined plane to convey the stones, which may be deposited thereon to the receptacle —9—, the conveyer belts being connected by cross-bars —58— at suitable intervals for carrying the stones upwardly and rearwardly to the place of discharge into said receptacle.

A suitable platform or flat support —59— is carried by the bearings for the sprocket wheels —56— and —57— directly under the upper side of the conveyer belt to support the same particularly when conveying the stones to the receptacle —9—. Upright guard plates —60— are mounted upon the supplemental frame —6— at opposite sides of the conveyer belt to prevent lateral displacement of the stones from said belt in transit from the drum to the receptacle —9—, which is suspended on the frame directly below the rear end of the conveyer by suitable hangers —61—.

Figure 2:
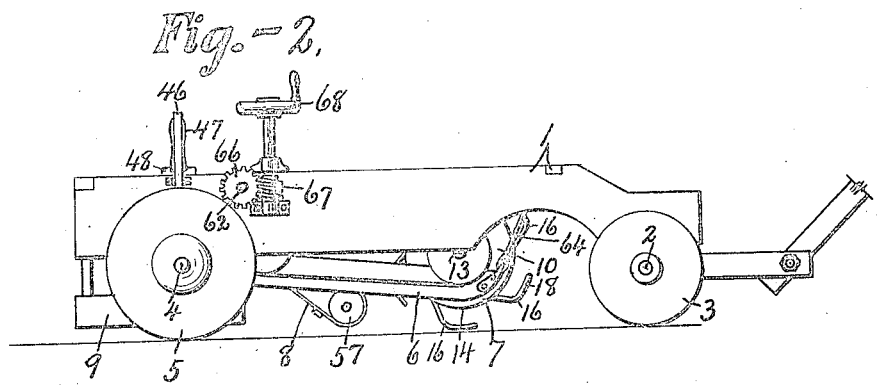

Suitable means are provided for raising and lowering the front end of the supplemental frame —6— together with the drum and conveyer carried thereby to cause pick-up fingers of the drum to enter greater or less distances into the ground or to be elevated clear of the ground; as for example, in drawing a load to the place of discharge and return when the pick-up device is not in use and for this purpose, a shaft —62— is journaled on the main supporting frame and is provided with a pair of reels —63— in axially spaced relation and connected by cables —64— to the front end of the supplemental frame —6— after passing over suitable sheaves —65— as shown in Figs. 1 and 2, said shaft —62— being provided with a worm gear —66— engaged by a worm shaft —67—, which is also journaled on the main frame —1— and is provided with a hand-wheel —68— by which it may be rotated to operate the shaft —62— and thereby to wind and unwind the cables —64— for raising and lowering the front end of the supplemental frame —6—, the worm serving to hold the shaft —62— and parts operated thereby in any position of adjustment.

The operation of my invention will be readily understood upon the foregoing description and the accompanying drawings, and while the various mechanisms shown are particularly efficient in carrying out the objects stated, it is evident that they may be materially modified without departing from the spirit of my invention.

What I claim is:

1. A stone-picker comprising a wheeled vehicle adapted to be drawn along and upon the surface of the ground, a rotary drum movable about an axis parallel with that of the wheels, means actuated by the wheels for rotating the drum in a reverse direction to that of the wheels, an endless conveyer at the rear of the drum and operated by a part of said means for receiving stones from the drum, a receptacle under-lying the rear end of the conveyer for receiving stones therefrom, and hook-shaped pick-up fingers projecting from the periphery of the drum in the direction of rotation thereof for picking up stones and depositing them on the conveyer, said pick-up fingers being arranged in rows lengthwise of the drum and in circumferentially spaced relation, said drum having guard-plates hinged to swing inwardly and outwardly between the several rows of fingers, and means for causing said guard-plates to swing outwardly as the several rows of pick-up fingers are successively presented to their discharging positions.

2. In a mechanical stone-picker, the combination of a wheeled vehicle, a rotary drum thereon, a series of pick-up fingers mounted on the drum and arranged in lengthwise rows in circumferentially spaced relation, means for rotating the drum, guard-plates hinged to the drum to swing inwardly and outwardly between the several rows of fingers, and means for causing the guard-plates to swing outwardly as the several rows of fingers are successively brought to a predetermined position.

3. In a mechanical stone-picker, the combination of a wheeled vehicle, a rotary drum mounted thereon, means actuated by certain of the wheels of said vehicle for rotating the drum, pick-up fingers projecting from the periphery of the drum in the direction of rotation thereof and arranged in rows lengthwise of the drum in circumferentially spaced relation, all of the fingers of each row being movable endwise on the drum, and alternate fingers of each row having an independent oscillatory motion in the direction of rotation.

In witness whereof I have hereunto set my hand this 30th day of September 1921.

EUGENE C. CLARK.

Witnesses:
 JOHN M. FARRELL,
 CHARLES N. BERGER.